(12) United States Patent
Naito et al.

(10) Patent No.: US 9,873,432 B2
(45) Date of Patent: Jan. 23, 2018

(54) CONTROL APPARATUS FOR VEHICLE

(71) Applicants: ADVICS CO., LTD., Kariya, Aichi-pref. (JP); DENSO CORPORATION, Kariya-shi, Aichi-ken (JP)

(72) Inventors: Masayuki Naito, Nagakute (JP); Tomokazu Kato, Toyota (JP); Kousuke Baba, Kariya (JP); Hiroaki Niino, Toyota (JP); Masayoshi Ooishi, Anjo (JP)

(73) Assignees: ADVICS CO., LTD., Aichi-Pref. (JP); DENSO CORPORATION, Aichi-Ken (JP)

( * ) Notice: Subject to any disclaimer, the term of this patent is extended or adjusted under 35 U.S.C. 154(b) by 0 days.

(21) Appl. No.: 14/747,363

(22) Filed: Jun. 23, 2015

(65) Prior Publication Data

US 2015/0375746 A1 Dec. 31, 2015

(30) Foreign Application Priority Data

Jun. 25, 2014 (JP) ................................. 2014-130695

(51) Int. Cl.
*G06F 7/70* (2006.01)
*G06F 19/00* (2011.01)
*G06G 7/00* (2006.01)
*G06G 7/76* (2006.01)
*B60W 30/18* (2012.01)
*B60W 10/08* (2006.01)
(Continued)

(52) U.S. Cl.
CPC ...... *B60W 30/18063* (2013.01); *B60W 10/08* (2013.01); *B60W 10/184* (2013.01); *B60W 2520/04* (2013.01); *B60W 2520/28* (2013.01); *B60W 2540/10* (2013.01); *B60W 2540/12* (2013.01); *B60W 2710/083* (2013.01); *B60W 2710/182* (2013.01); *Y02T 10/7258* (2013.01)

(58) Field of Classification Search
CPC ............ B60W 30/18063; B60W 10/06; B60L 11/123; B60K 6/543
USPC .............................................. 701/70, 22, 41
See application file for complete search history.

(56) References Cited

U.S. PATENT DOCUMENTS

| 6,346,064 B1* | 2/2002 | Hada ...................... B60K 6/543 |
| | | 477/171 |
| 2007/0027598 A1* | 2/2007 | Mori ...................... B60W 10/06 |
| | | 701/41 |
| 2014/0309828 A1* | 10/2014 | Yamazaki ............. B60L 11/123 |
| | | 701/22 |

FOREIGN PATENT DOCUMENTS

JP 11-285108 A 10/1999

* cited by examiner

*Primary Examiner* — Mahmoud Ismail
(74) *Attorney, Agent, or Firm* — Buchanan Ingersoll & Rooney PC

(57) ABSTRACT

A control apparatus for a vehicle includes processing circuitry. The processing circuitry calculates a target torque such that the greater the amount of brake operation is, the smaller the target torque becomes. The processing circuitry controls the drive motor such that the creep torque is smaller when brake operation is being performed by the driver than when the brake operation is not being performed by the driver. The control circuitry controls the brake device such that, when the brake operation is being performed by the driver, the brake torque approaches a target brake torque. The processing circuitry sets a decrease gradient of the creep torque to be smaller than a decrease gradient of the target (Continued)

torque when the brake operation amount is increased under a condition in which the creep torque is being output by the drive motor.

7 Claims, 10 Drawing Sheets

(51) Int. Cl.
*B60W 10/184* (2012.01)
*A01B 69/00* (2006.01)
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B62D 6/00* (2006.01)
*B62D 11/00* (2006.01)
*B62D 12/00* (2006.01)
*B63G 8/20* (2006.01)

CONTROL APPARATUS FOR VEHICLE

BACKGROUND OF THE INVENTION

The present invention relates to a control apparatus for a vehicle that is used in a vehicle capable of traveling at a low speed by causing a drive motor to output creep torque even when accelerator operation is not being performed by the driver.

As described in Japanese Laid-Open Patent Publication No. 11-285108, for example, some vehicles including a drive motor as a drive source, such as hybrid vehicles and electric vehicles, are capable of traveling at a low speed by causing the drive motor to output creep torque even when accelerator operation is not being performed by the driver.

In the vehicle described in the aforementioned document, if brake operation is performed by the driver under a condition in which the drive motor is outputting the creep torque, the creep torque decreases as the amount of the brake operation increases. This reduces the power consumed by the drive motor compared to a case in which the creep torque at the time the brake operation is being performed by the driver is maintained at the creep torque (a predetermined creep torque) immediately before the brake operation is started.

In a case in which creep torque decreases in response to brake operation by the driver as in the case of Japanese Laid-Open Patent Publication No. 11-285108, vibration can occur in the torque transmission system for transmitting output torque from the drive motor to the driven wheels.

Referring to the diagrams of FIGS. 12A and 12B representing a torque transmission system, an example of a factor causing vibration through creep torque decrease will now be described. The torque transmission system illustrated in FIGS. 12A and 12B includes a gear Gm, which is connected to a drive motor, and a gear Gt, which is connected to the driven wheels. The gears Gm, Gt are meshed with each other.

When the driven wheels are rotated by creep torque output by the drive motor, the gear Gm rotates in a predetermined direction X as illustrated in FIG. 12A. This causes a tooth surface Gm1 of a tooth located forward in direction X in the gear Gm, which is connected to the drive motor, to contact a tooth surface Gt2 of a tooth located rearward in direction X in the gear Gt, which is connected to the driven wheels. Creep torque is thus transmitted to the Gear Gt through the gear Gm. In this manner, the creep torque is transmitted to the driven wheels through the torque transmission system, thus rotating the driven wheels to cause the vehicle to travel. This state of the torque transmission system, in which the drive motor drives the driven wheels, is referred to as a drive state.

As the creep torque output by the drive motor is gradually decreased in the drive state, the creep torque transmitted from the drive motor to the gear Gm and the torque transmitted from the driven wheels to the gear Gt become substantially equilibrated with each other. This causes the tooth surface Gm1 of the gear Gm to separate from the tooth surface Gt2 of the gear Gt, thus blocking transmission of the creep torque output by the drive motor to the driven wheels.

As the creep torque output by the drive motor is decreased further, the torque transmitted from the driven wheels to the gear Gt exceeds the creep torque transmitted from the drive motor to the gear Gm. Then, as illustrated in FIG. 12B, a tooth surface Gt1 of a tooth located forward in direction X in the gear Gt, which is connected to the driven wheels, is caused to contact a tooth surface Gm2 of a tooth located rearward in direction X in the gear Gm, which is connected to the drive motor. Such contact between the tooth surface Gt1 and the tooth surface Gm2 causes vibration in the torque transmission system. This state of the torque transmission system, in which the driven wheels drive the drive motor, is referred to as a driven state.

As a method for restraining vibration caused by the above-described changes in contacting tooth surfaces of the gears Gm, Gt, which is, in other words, backlash, of the torque transmission system, creep torque may be maintained at the aforementioned predetermined value even if brake operation is performed by the driver under a condition in which the creep torque is being output by the drive motor. Then, as the amount of brake operation increases, brake torque applied to the driven wheels by the brake device is increased. This method maintains the torque transmission system in the drive state and restrains transition of the torque transmission system to the driven state. Vibration due to the backlash is thus unlikely to be generated in this torque transmission system. However, if the method is employed, the creep torque is maintained without being decreased even if brake operation is performed by the driver. This increases the power consumed by the drive motor.

SUMMARY OF THE INVENTION

Accordingly, it is an objective of the present invention to provide a control apparatus for a vehicle capable of decreasing vibration due to backlash of a torque transmission system for transmitting output torque of a drive motor to a wheel while reducing power consumed by a vehicle.

To achieve the foregoing objective and in accordance with one aspect of the present invention, a control apparatus for a vehicle is provided that is adapted for a vehicle having a drive motor for outputting creep torque to a wheel when accelerator operation is not being performed by a driver and a brake device for applying brake torque to the wheel. The control apparatus includes processing circuitry that: calculates a target torque that is a target value of a composite torque of the brake torque applied to the wheel by the brake device and the creep torque output by the drive motor such that the greater an amount of brake operation is, the smaller the target torque becomes; controls the drive motor such that the creep torque output by the drive motor is smaller when brake operation is being performed by the driver than when the brake operation is not being performed by the driver; controls the brake device such that, when the brake operation is being performed by the driver, the brake torque applied to the wheel by the brake device approaches a target brake torque corresponding to the difference between the target torque and the creep torque; and sets a decrease gradient of the creep torque to be smaller than a decrease gradient of the target torque when the brake operation amount is increased under a condition in which the creep torque is being output by the drive motor.

To achieve the foregoing objective and in accordance with another aspect of the present invention, a control apparatus for a vehicle is provided that is adapted for a vehicle having a drive motor for outputting creep torque to a wheel when accelerator operation is not being performed by a driver and a brake device for applying brake torque to the wheel. The control apparatus includes processing circuitry that: calculates a target torque that is a target value of a composite torque of the brake torque applied to the wheel by the brake device and the creep torque output by the drive motor such that the greater an amount of brake operation is, the smaller the target torque becomes; stops the drive motor when the accelerator operation is not being performed by the driver with the vehicle in a stopped state; controls the brake device such that, when the brake operation is being performed by the driver, the brake torque applied to the wheel by the brake device approaches a target brake torque corresponding to the difference between the target torque and the creep torque; and operates the drive motor to start to output the creep torque when the brake device is applying the brake torque to the wheel in a state in which the brake operation amount is decreased with the vehicle in a stopped state.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
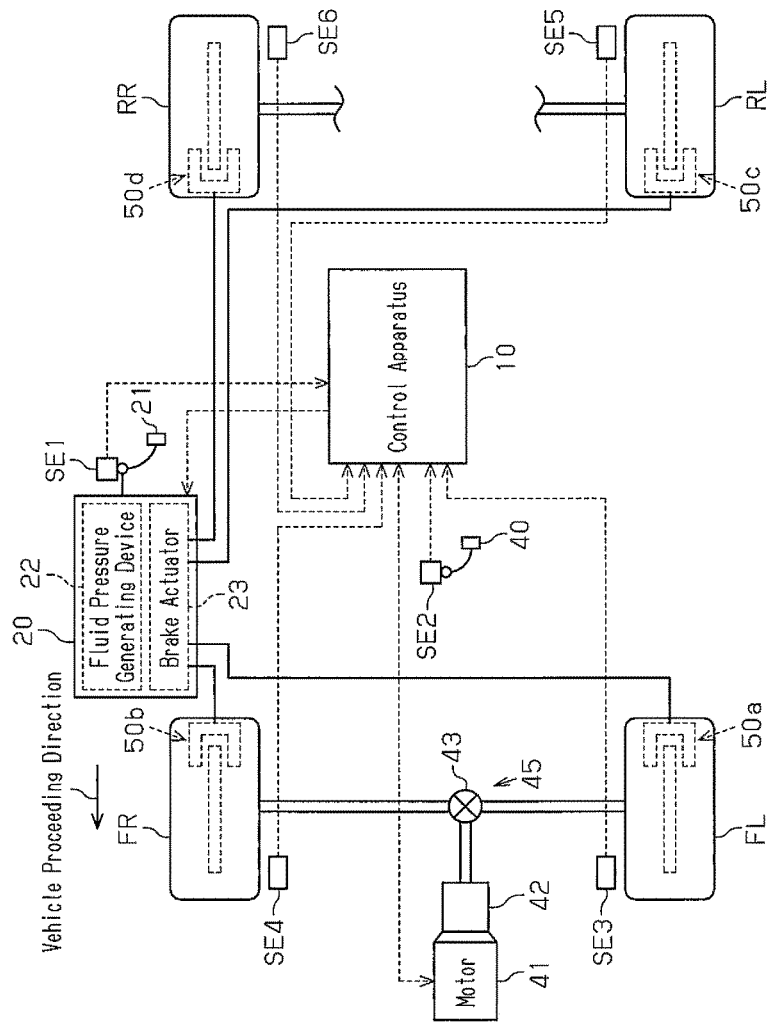
FIG. 1 is a block diagram representing a vehicle including a control apparatus.

FIG. 1 illustrates an example of a vehicle including a control apparatus 10. Referring to FIG. 1, the vehicle includes four wheels (a front left wheel FL, a front right wheel FR, a rear left wheel RL, and a right rear wheel RR), a brake device 20, an accelerator operating member 40, and a drive motor 41. The brake device 20 is capable of adjusting brake torque applied to the wheels FL, FR, RL, RR. The accelerator operating member 40 is operated by the driver. The drive motor 41 outputs drive torque based on the amount of operation of the accelerator operating member 40. That is, the vehicle is an electric vehicle including the drive motor 41 as a drive source. A continuously variable decelerator 42 is connected to the output shaft of the drive motor 41. The drive torque output by the drive motor 41 is input to the decelerator 42. The drive torque output by the decelerator 42 is then transmitted to the front wheels FL, FR, which are driven wheels, through a differential gear 43. That is, in the vehicle including the control apparatus 10 of the present embodiment, a torque transmission system 45 includes the decelerator 42 and the differential gear 43 and transmits the drive torque output by the drive motor 41 to the front wheels FL, FR. Hereinafter, operation of the accelerator operating member 40 by the driver will be referred to as accelerator operation.

The brake device 20 has a brake operating member 21, a fluid pressure generating device 22, brake mechanisms 50a, 50b, 50c, and 50d, which are provided for the wheels FL, FR, RL, and RR, respectively, and a brake actuator 23. The brake operating member 21 is joined to the fluid pressure generating device 22. The brake actuator 23 adjusts wheel cylinder pressure (hereinafter, referred to as WC pressure), which is the pressure in a wheel cylinder of each of the brake mechanisms 50a, 50b, 50c, 50d. The brake device 20 has a brake operation amount detecting sensor SE1 for detecting a brake operation amount, which is the amount of operation of the brake operating member 21 by the driver (hereinafter, referred to as brake operation amount BP). Hereinafter, operation of the brake operating member 21 by the driver will be referred to as brake operation.

When the braking operation is carried out, the brake device 20 supplies brake fluid separately into the wheel cylinders of the respective brake mechanisms 50a to 50d each by the amount corresponding to the brake operation amount BP. The brake mechanisms 50a to 50d then apply brake torque to the corresponding wheels FL, FR, RR, RL in correspondence with the WC pressure. The brake device 20 is capable of adjusting the WC pressure separately for the respective wheels FL, FR, RL, RR even when the brake operation is performed. That is, the brake device 20 is capable of separately adjusting the brake torque applied to the wheels FL, FR, RL, RR.

The control apparatus 10 will now be described.

The control apparatus 10, as illustrated in FIG. 1, includes a computer, which is processing circuitry, including a CPU, memories (such as a ROM and a RAM), and an input-output interface, for example. The control apparatus 10 executes various functions in accordance with programs stored in a memory. An accelerator operation amount detecting sensor SE2 and four wheel speed sensors SE3, SE4, SE5, SE6, as well as the brake operation amount detecting sensor SE1, are electrically connected to the control apparatus 10. The accelerator operation amount detecting sensor SE2 detects the amount of operation of the accelerator operating member 40 by the driver, which is the accelerator operation amount. The wheel speed sensors SE3, SE4, SE5, and SE6 are arranged in correspondence with the wheels FL, FR, RL, and RR, respectively. Each of the wheel speed sensors SE3 to SE6 detects a wheel speed, which is the rotation speed of the corresponding one of the wheels. The control apparatus 10 controls the brake device 20 and the drive motor 41 based on information detected by the various sensors SE1 to SE6.

That is, the control apparatus 10 calculates a target torque Tt, which is a torque requested by the driver of the vehicle, based on the accelerator operation amount detected by the accelerator operation amount detecting sensor SE2 and the brake operation amount BP detected by the brake operation amount detecting sensor SE1. The control apparatus 10 then controls the brake device 20 and the drive motor 41 based on the calculated target torque Tt.

When the accelerator operation is carried out, for example, the control apparatus 10 calculates the target torque Tt such that the greater the accelerator operation amount, which is detected by the accelerator operation amount detecting sensor SE2, the greater the target torque Tt becomes. The control apparatus 10 then controls the drive motor 41 such that the drive torque output by the drive motor 41 approaches the target torque Tt. That is, when the brake operation is not being performed while the accelerator operation is carried out, the target torque Tt is equivalent to the target drive torque.

When the brake operation is carried out, the control apparatus 10 calculates a target brake torque TBt based on the brake operation amount BP, which is detected by the brake operation amount detecting sensor SE1. The control apparatus 10 then controls the brake device 20 to operate such that a total brake torque applied to the wheels FL, FR, RL, RR by the brake device 20 (hereinafter, referred to as brake torque TB) approaches the target brake torque TBt.

The target brake torque TBt and the target torque Tt has the relationship described below. In the vehicle including the control apparatus 10 of the present embodiment, the drive motor 41 outputs drive torque even when the accelerator operation is not being performed. The drive torque in this state, in which the accelerator is not being operated, is referred to as creep torque TC. As a result, even without the accelerator operation, the creep torque TC, which is output by the drive motor 41, allows the vehicle to travel at a low speed.

When the brake operation is carried out, the control apparatus 10 of the present embodiment calculates the target torque Tt as a target of composite torque of the brake torque TB, which is the total brake torque applied to the wheels FL, FR, RL, RR by the brake device 20, and the creep torque TC output by the drive motor 41. Specifically, when the brake operation is carried out, the control apparatus 10 calculates the target torque Tt such that the greater the brake operation amount BP is, the smaller the target torque Tt becomes. The control apparatus 10 then sets the difference between the calculated target torque Tt and the creep torque TC as the target brake torque TBt. That is, the control apparatus 10 performs coordinate control on the drive motor 41 and the brake device 20 such that the composite torque of the creep torque TC output by the drive motor 41 and the brake torque TB, which is the total brake torque applied to the wheels FL, FR, RL, RR by the brake device 20, becomes equal to the target torque Tt.

Figure 2:
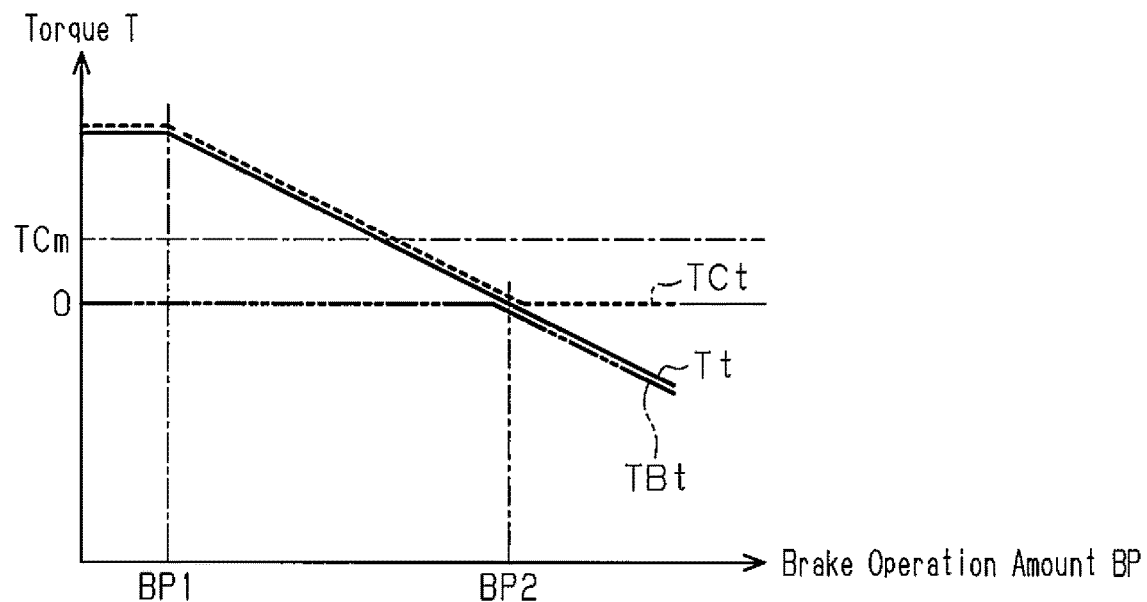
FIG. 2 is a timing diagram representing changes in target torque, target creep torque, and target brake torque in correspondence with a brake operation amount in a control apparatus of a comparative example.

In a vehicle including the drive motor 41 as a drive source, decrease of the creep torque TC is given priority over increase of the brake torque TB is some cases when the brake operation is being carried out. FIG. 2 is a timing diagram representing, as a comparative example, changes in target creep torque TCt, which is the target of the creep torque TC, the target brake torque TBt, and the target torque Tt in the aforementioned vehicle. The target brake torque TBt becomes greater as it becomes smaller than 0 (zero), or, in other words, greater in the negative direction, as viewed in the timing diagram.

With reference to FIG. 2, if the brake operation amount BP is smaller than a first operation amount BP1 under a condition in which the accelerator operation is not being performed and the drive motor 41 outputs the creep torque TC, the target brake torque TBt is set to 0 (zero). The target creep torque TCt thus becomes equal to the target torque Tt. After the brake operation amount BP exceeds the first operation amount BP1, the target torque Tt becomes smaller as the brake operation amount BP becomes greater.

As long as the brake operation amount BP is greater than the first operation amount BP1 and smaller than a second operation amount BP2 (the target torque Tt is a positive value), the target brake torque TBt is maintained at 0 (zero). Therefore, in the period in which the brake operation amount BP is greater than the first operation amount BP1 and smaller than the second operation amount BP2, the target creep torque TCt is decreased together with the target torque Tt and, correspondingly, the creep torque TC is decreased gradually. When the brake operation amount BP becomes equal to the second operation amount BP2, the target torque Tt and the target creep torque TCt are each set to 0 (zero). That is, at the time point at which the brake operation amount BP becomes equal to the second operation amount BP2, the creep torque TC is set to 0 (zero).

After the brake operation amount BP exceeds the second operation amount BP2, the target creep torque TCt is maintained at 0 (zero) while the target torque Tt continues to be decreased as the brake operation amount BP increases. Correspondingly, as the brake operation amount BP becomes greater, the target brake torque TBt becomes gradually greater. This gradually increases the brake torque TB.

Figure 12A:
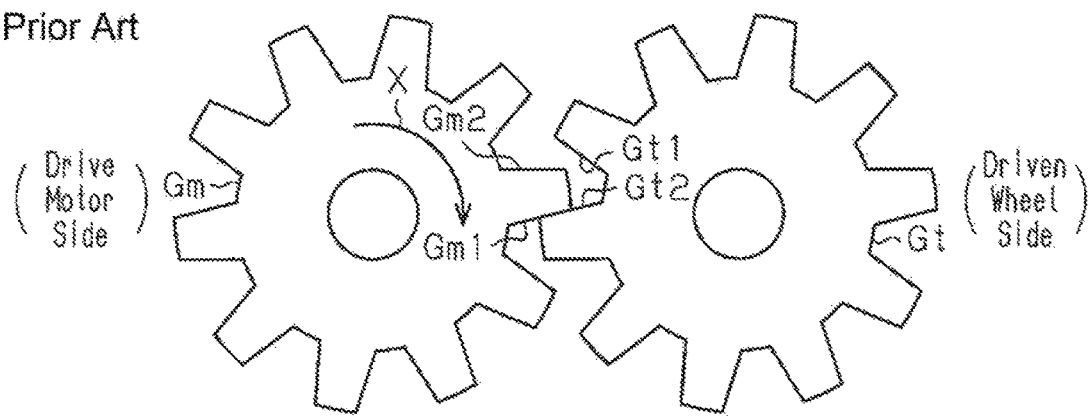
FIG. 12A is a diagram schematically showing a portion of a torque transmission system in a drive state in which a gear connected to a drive motor drives a gear connected to driven wheels.
Figure 12B:
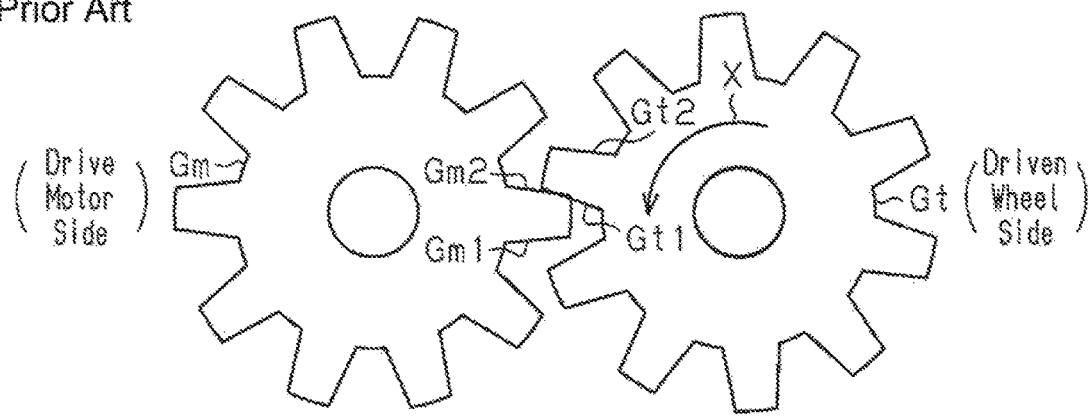
FIG. 12B is a diagram schematically showing a portion of a torque transmission system in a driven state in which a gear connected to a drive motor is driven by a gear connected to driven wheels.

When decrease of the creep torque TC is given priority over increase of the brake torque TB as in the above-described case, vibration due to backlash may occur in the torque transmission system 45. That is, a gradual decrease in the creep torque TC, which is output by the drive motor 41, causes the torque transmission system 45 to shift from the drive state, in which the gear Gm connected to the drive motor drives the gear Gt connected to the driven wheels as illustrated in FIG. 12A, to the driven state, in which the gear Gm connected to the drive motor is driven by the gear GT connected to the driven wheels as illustrated in FIG. 12B. When the torque transmission system 45 shifts to the driven state, the tooth surface Gt1 of the gear Gt contacts the tooth surface Gm2 of the gear Gm, thus producing impact and vibration from the torque transmission system 45. Such vibration may be transmitted to the occupant of the vehicle as vehicle vibration and cause discomfort for the occupant(s).

To restrain transmission of vibration caused through actuation of the drive motor 41 to the passenger compartment, the drive motor 41 may be installed in the vehicle in a swinging manner. In this case, the aforementioned vibration may cause the drive motor 41 to swing in the front-rear direction, thus producing front-rear swinging behavior of the vehicle (pitching behavior). This can cause discomfort for the occupant of the vehicle.

To restrain the above-described phenomenon, it is preferable to reduce decrease gradient in the decrease of the creep torque TC at the time the creep torque TC becomes equal to the creep torque TC (a transitional torque TCm) corresponding to the time point at which the torque transmission system 45 shifts to the driven state. The decrease gradient of the creep torque TC indicates the decrease amount of the creep torque TC per unit time. This allows the torque transmission system 45 to gently shift from the drive state to the driven state, thus restraining vibration due to backlash of the torque transmission system 45.

Specifically, if the brake operation is started when the drive motor 41 is outputting the creep torque TC, the creep torque TC is gradually decreased as the brake operation amount BP increases. As the creep torque TC becomes smaller in this manner, the decrease gradient of the creep torque TC becomes gradually smaller. That is, the decrease gradient of the creep torque TC is adjusted such that the decrease gradient of the creep torque TC is minimized at the time point at which the creep torque TC becomes equal to the aforementioned transitional torque TCm. The decrease gradient of the creep torque TC is then re-increased when the creep torque TC becomes smaller than the transitional torque TCm.

Figure 3:
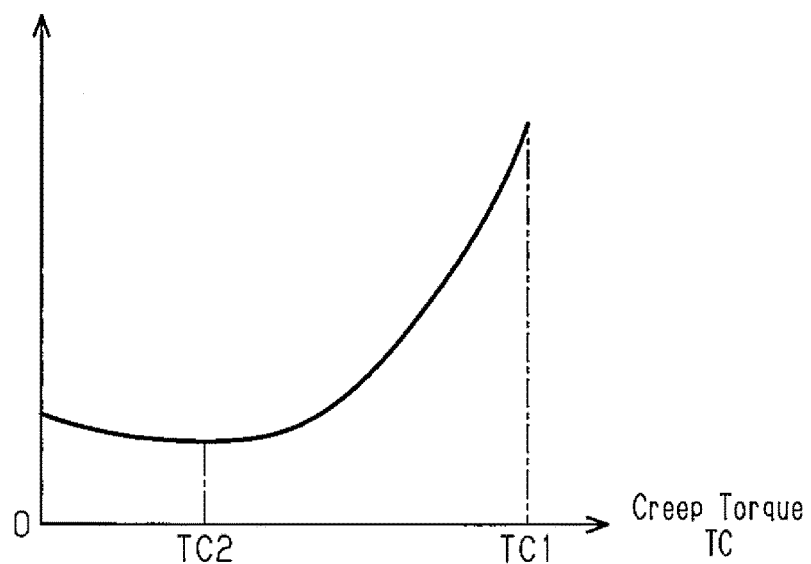
FIG. 3 is a map representing a relationship between creep torque and a change gradient determination value.

FIG. 3 is an example of a map referred to by the control apparatus 10 when the decrease gradient of the creep torque TC is adjusted in the above-described manner. The map represents a relationship between the creep torque TC output by the drive motor 41 and a change gradient determination value VTCth, with which decrease of the creep torque TC is restricted. The change gradient determination value VTCth is the reference value for restricting the decrease amount of the creep torque TC per unit time when the creep torque TC is decreased in response to the brake operation.

Referring to FIG. 3, decrease of the creep torque TC is unrestricted as long as the creep torque TC is greater than or equal to a reference creep torque TC1. In contrast, if the creep torque TC is smaller than the reference creep torque TC1, the decrease of the creep torque TC is restricted. Specifically, when the creep torque TC is in the range between the reference creep torque TC1 and a predetermined creep torque TC2, the change gradient determination value VTCth becomes smaller as the creep torque TC becomes smaller. When the creep torque TC is smaller than the creep torque TC2, the change gradient determination value VTCth becomes greater as the creep torque TC becomes smaller.

The predetermined creep torque TC2 is set to a value smaller than the reference creep torque TC1. In a case in which the vehicle is in a certain traveling state, it is preferable to set the creep torque TC2 to a value equal or approximate to the aforementioned transitional torque TCm at the time the creep torque TC is decreased through the brake operation.

Next, with reference to the flowchart of FIG. 4, a process routine executed by the control apparatus 10 at the time the brake operation is started when the creep torque TC is output by the drive motor 41 will be described. The process routine is carried out at predetermined control cycles in the period from when the start of the brake operation is detected to when the vehicle stops.

Figure 4:
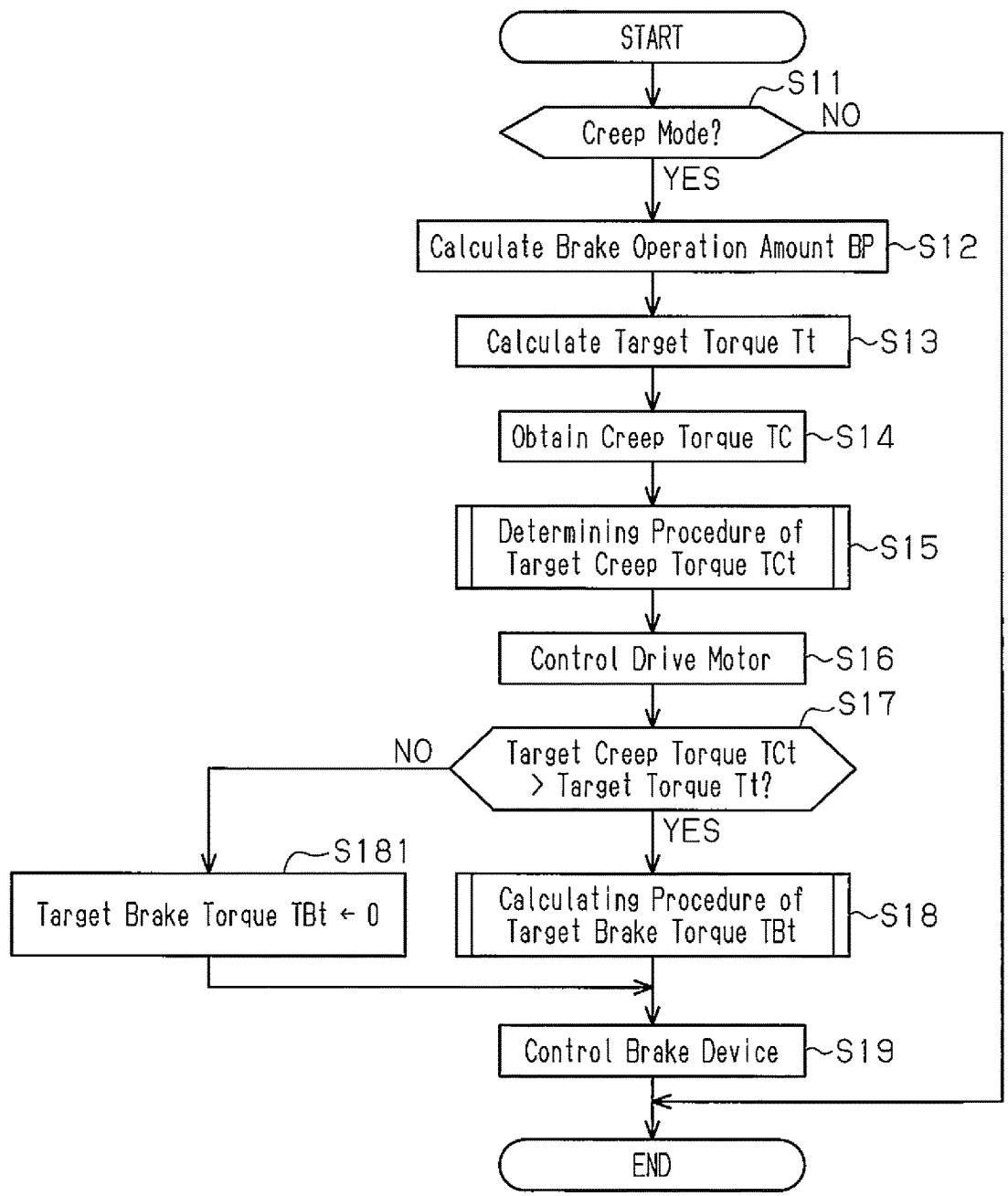
FIG. 4 is a flowchart representing a process routine executed when brake operation is performed under a condition in which the creep torque is being output.

Referring to FIG. 4, in the process routine, the control apparatus 10 determines whether the vehicle is in a creep mode, in which the drive motor 41 is permitted to output the creep torque TC (Step S11). Such determination regarding the creep mode may be made depending on whether the accelerator operation is currently carried out, for example.

If the control apparatus 10 determines that the vehicle is not in the creep mode (Step S11: NO), the control apparatus 10 suspends the process routine. In contrast, if the control apparatus 10 determines that the vehicle is in the creep mode (Step S11: YES), the control apparatus 10 calculates the brake operation amount BP based on a detection signal output by the brake operation amount detecting sensor SE1 (Step S12). Subsequently, the control apparatus 10 calculates the target torque Tt based on the calculated brake operation amount BP (Step S13). The target torque Tt is calculated to a smaller value as the brake operation amount BP becomes greater. In this regard, the control apparatus 10 functions as an example of a torque calculating section.

Then, the control apparatus 10 obtains the creep torque TC that is currently output by the drive motor 41 (Step S14). For example, the target creep torque TCt(i−1) determined in the previous control cycle may be set as the current creep torque TC. Alternatively, the current creep torque TC may be estimated by the control apparatus 10 through calculation based on the power output to the drive motor 41.

Subsequently, the control apparatus 10 executes a determining procedure, which will be described below with reference to FIG. 5, to determine the target creep torque TCt (Step S15). Then, the control apparatus 10 controls the drive motor 41 such that the creep torque TC approaches the determined target creep torque TCt (Step S16). Therefore, the control apparatus 10 functions as an example of a motor control section that decreases the creep torque TC, which is output by the drive motor 41, when the brake operation is carried out compared to when the brake operation is not performed.

The control apparatus 10 then determines whether the target creep torque TCt is greater than the target torque Tt (Step S17). If a determination that the target creep torque TCt is equal to the target torque Tt is made (Step S17: NO), the brake device 20 does not have to apply the brake torque TB to the wheels FL, FR, RL, RR. In contrast, if a determination that the target creep torque TCt is greater than the target torque Tt is made (Step S17: YES), the brake torque TB must be applied to the wheels FL, FR, RL, RR to compensate for the difference between the target creep torque TCt and the target torque Tt.

Therefore, if the control apparatus 10 determines that the target creep torque TCt is smaller than or equal to the target torque Tt (Step S17: NO), the control apparatus 10 sets the target brake torque TBt to 0 (zero) (Step S181) and then carries out Step S19, which will be described below. In contrast, if the control apparatus 10 determines that the target creep torque TCt is greater than the target torque Tt (Step S17: YES), the control apparatus 10 performs a calculating procedure of the target brake torque TBt (Step S18) and then carries out the subsequent step, which is Step S19.

The target brake torque TBt is the sum of the reference brake torque corresponding to the target torque Tt and a compensation brake torque based on the target creep torque TCt. In Step S18, the target brake torque TBt is calculated using the reference brake torque and the compensation brake torque. The reference brake torque is set to 0 (zero) when the target torque Tt calculated in Step S13 is a positive value or 0 (zero) and to the absolute value |Tt| of the target torque when the target torque Tt is a negative value. The compensation brake torque is set to the value obtained by subtracting the target torque Tt from the target creep torque TCt when the target torque Tt calculated in Step S13 is a positive value or 0 (zero) and to the value equal to the target creep torque TCt when the target torque Tt is a negative value. Therefore, in the present embodiment, when the target torque Tt is a positive value or 0 (zero), the target brake torque TBt is equal to the value obtained by subtracting the target torque Tt from the target creep torque TCt. When the calculated target torque Tt is a negative value, the target brake torque TBt is equal to the sum of the absolute value |Tt| of the target torque and the target creep torque TCt, or, in other words, the value obtained by subtracting the target torque Tt, which is a negative value, from the target creep torque TCt. That is, in the present embodiment, the target brake torque TBt is equal to the difference between the target creep torque TCt and the target torque Tt. As long as the compensation brake torque is a value corresponding to the difference between the target creep torque TCt and the target torque Tt, the compensation brake torque may be any suitable value including, for example, a value obtained by adding (or subtracting) a predetermined offset value to (or from) the aforementioned difference.

In Step S19, the control apparatus 10 controls the brake device 20 such that the brake torque TB applied to the wheels FL, FR, RL, RR by the brake device 20 approaches the target brake torque TBt. The control apparatus 10 thus functions as a brake control section. Afterwards, the control apparatus 10 suspends the process routine.

Next, referring to the flowchart of FIG. 5, the determining procedure of the target creep torque TCt of Step S15 will be described.

Figure 5:
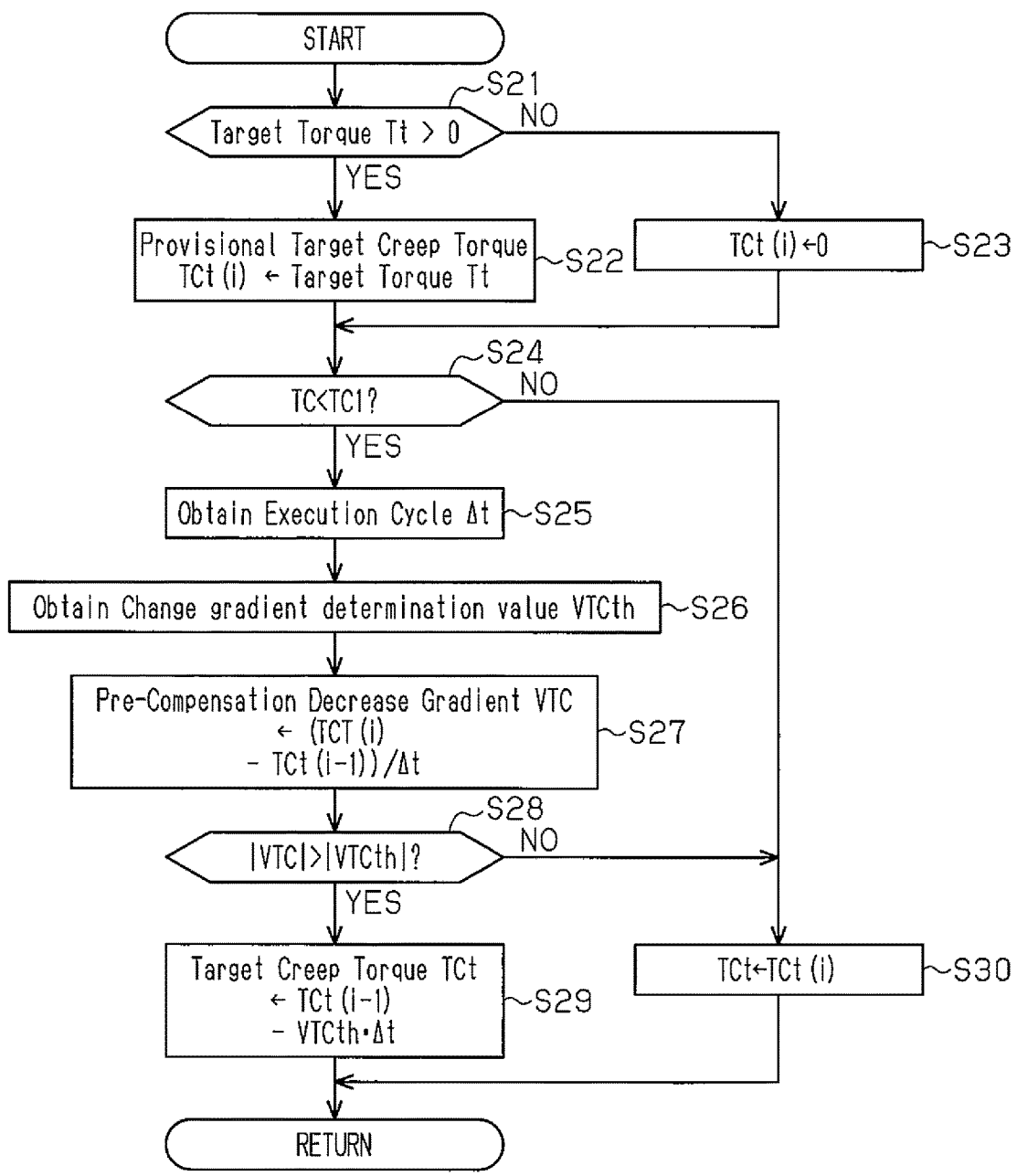
FIG. 5 is a flowchart representing a process routine executed to determine the target creep torque.

With reference to FIG. 5, in the process routine, the control apparatus 10 determines whether the target torque Tt, which has been calculated in Step S13, is greater than 0 (zero) (Step S21). When the control apparatus 10 determines that the target torque Tt is greater than 0 (zero) (Step S21: YES), the control apparatus 10 sets a provisional target creep torque TCt(i) as the target torque Tt (Step S22) and carries out Step S24, which will be described below. In contrast, if the control apparatus 10 determines that the target torque Tt is smaller than or equal to 0 (zero) (Step S21: NO), the control apparatus 10 sets the provisional target creep torque TCt(i) to 0 (zero) (Step S23) and performs the subsequent step, which is Step S24.

In Step S24, the control apparatus 10 determines whether the creep torque TC obtained in Step S14 is smaller than the aforementioned reference creep torque TC1 (see FIG. 3). As has been described, when a determination that the creep torque TC is greater than or equal to the reference creep torque TC1 is made, decrease of the creep torque TC is unrestricted. In contrast, if a determination that the creep torque TC is smaller than the reference creep torque TC1 is made, the decrease of the creep torque TC must be restricted appropriately. Therefore, if a determination that the creep torque TC is greater than or equal to the reference creep torque TC1 is made (Step S24: NO), Step S30, which will be described below, is carried out.

When the control apparatus 10 determines that the creep torque TC is smaller than the reference creep torque TC1 (Step S24: YES), the control apparatus 10 obtains an execution interval Δt, which is a control cycle of the process routine (Step S25). Then, referring to the map of FIG. 3, the control apparatus 10 determines the change gradient determination value VTCth in correspondence with the previous target creep torque TCt(i−1) (Step S26). Subsequently, the control apparatus 10 obtains a pre-correction decrease gradient VTC by dividing the value determined by subtracting the previous target creep torque TCt(i−1) from the provisional target creep torque TCt(i) by the execution interval Δt (Step S27).

The control apparatus 10 then determines whether the absolute value |VTC| of the calculated pre-correction decrease gradient is greater than the absolute value |VICth| of the change gradient determination value (Step S28). If a determination that the absolute value |VTC| of the pre-correction decrease gradient is greater than the absolute value |VTCth| of the change gradient determination value is made, the creep torque TC must be decreased in a restricted manner. Therefore, when the control apparatus 10 determines that the absolute value |VTC| of the pre-correction decrease gradient is greater than the absolute value |VTCth| of the change gradient determination value (Step S28: YES), the control apparatus 10 calculates the target creep torque TCt based on the previous creep torque TCt(i−1), the change gradient determination value VTCth, and the execution interval Δt (Step S29). That is, the control apparatus 10 multiplies the change gradient determination value VTCth by the execution interval Δt. Then, the control apparatus 10 subtracts the obtained product (VTCth·Δt) from the previous target creep torque TCt(i−1) and sets the obtained value as the target creep torque TCt. In this manner, as the procedure of FIG. 4 is repeatedly performed, the target creep torque TCt is gradually decreased. Afterwards, the control apparatus 10 suspends of the process routine.

In contrast, when the control apparatus 10 determines that the absolute value |VTC| of the pre-correction decrease gradient is smaller than or equal to the absolute value |VTCth| of the change gradient determination value (Step S28: NO), the control apparatus 10 sets the target creep torque TCt as the provisional target creep torque TCt(i) (Step S30). The control apparatus 10 then suspends the process routine.

Figure 6:
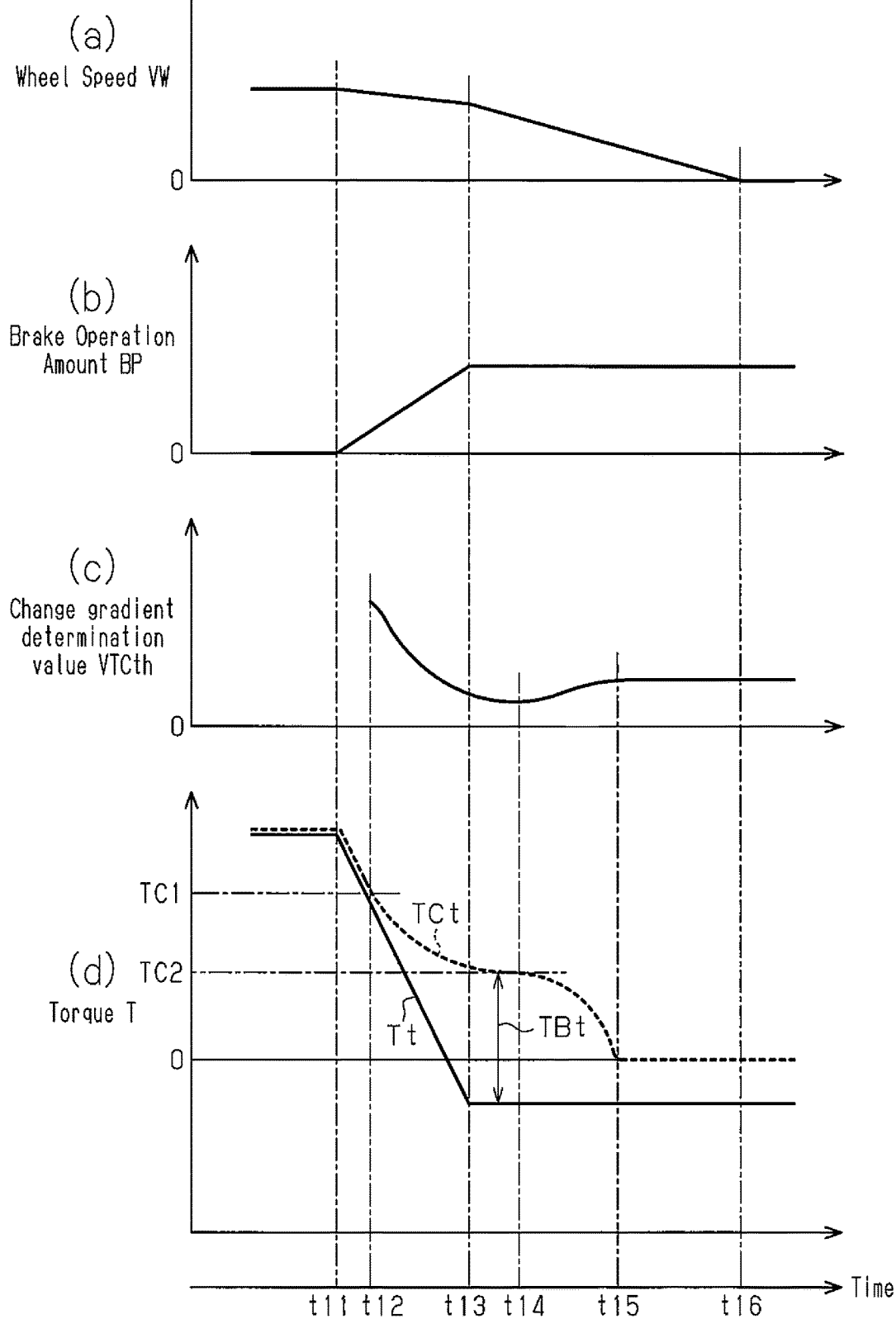
FIG. 6 is a timing diagram of a case in which the brake operation is performed under a condition in which the creep torque is being output and the vehicle is stopped, where section (a) represents changes in the wheel speed, section (b) represents changes in the brake operation amount, section (c) represents changes in the change gradient determination value, and section (d) represents changes in the target torque, the target creep torque, and the target brake torque.

With reference to the timing diagram of FIG. 6, operation of the vehicle at the time the brake operation is started under a condition in which the creep torque TC is being output will hereafter be described.

As represented in sections (a), (b), (c), and (d) of FIG. 6, when the vehicle travels, the brake operation is started and the brake operation amount BP starts to be increased at the first time point t11, thus causing the target torque Tt and the target creep torque TCt to start to be decreased. When the target creep torque TCt decreases, the creep torque TC, which is output by the drive motor 41, decreases correspondingly. This causes the vehicle body speed, which is the wheel speed VW of the vehicle, to start to decrease.

In the period from the first time point t11 to the second time point t12, the creep torque TC is greater than the reference creep torque TC1 (see FIG. 3). The creep torque TC remains as a comparatively great value. Therefore, in the period from the first time point t11 to the second time point t12, decrease of the target creep torque TCt is unrestricted. The decrease gradient of the target creep torque TCt is thus equal to the decrease gradient of the target torque Tt. As a result, the target brake torque TBt, which is the difference between the target torque Tt and the target creep torque TCt, is 0 (zero). The brake torque TB is thus not applied from the brake device 20 to the wheels FL, FR, RL, RR.

At the second time point t12, the creep torque TC becomes equal to the reference creep torque TC1. The target creep torque TCt is thus decreased in a restricted manner from the second time point t12. As a result, the absolute value |VTC| of the pre-correction decrease gradient becomes greater than the absolute value |VTCth| of the change gradient determination value, which is determined in correspondence with the current creep torque TC. The decrease gradient of the target creep torque TCt thus becomes smaller than the decrease gradient of the target torque Tt. That is, in the period from the second time point t12 to the third time point t13 in which the brake operation amount BP increases, the decrease gradient of the creep torque TC is smaller than the decrease gradient of the target torque Tt.

From the second time point t12, the decrease gradient of the target creep torque TCt is gradually decreased and the target brake torque TBt is thus gradually increased. As a result, the brake torque TB applied to the wheels FL, FR, RL, RR is gradually increased.

From the third time point t13, the brake operation amount BP is maintained. The target torque Tt, which is calculated in correspondence with the brake operation amount BP, is thus maintained at the value corresponding to the third time point t13. However, at the third time point t13, the target creep torque TCt is greater than 0 (zero). As a result, even though the target torque Tt is maintained at the value corresponding to the third time point t13, the target creep torque TCt continues to be decreased. Further, the decrease gradient of the target creep torque TCt, which is the decrease gradient of the creep torque TC, is gradually decreased even after the third time point t13.

The decrease gradient of the target creep torque TCt is minimized at the fourth time point t14, at which the creep torque TC becomes equal to the predetermined creep torque TC2. This is because the change gradient determination value VTCth is minimized when the creep torque TC becomes equal to the predetermined creep torque TC2. From the fourth time point t14, the change gradient determination value VTCth becomes greater as the creep torque TC becomes smaller. The decrease gradient of the creep torque TC thus becomes gradually greater. Then, at the fifth time point t15, which is before the sixth time point t16 at which the wheel speed VW becomes 0 (zero), or, in other words, the vehicle stops, the target creep torque TCt, which is the creep torque TC, becomes 0 (zero).

In the present embodiment, the predetermined creep torque TC2 is set to substantially coincide with the transitional torque TCm, which is the creep torque TC at the time point at which the torque transmission system 45 shifts from the drive state to the driven state. As a result, when the creep torque TC approaches the predetermined creep torque TC2 (which is the transitional torque TCm) while decreasing, the torque transmission system 45 shifts from the drive state to the driven state. At this stage, the decrease gradient of the creep torque TC is set smaller than the decrease gradient of the target torque Tt. The brake torque TB applied to the front wheels FL, FR, which are the driven wheels, is increased in correspondence with decrease of the creep torque TC. That is, transition of the state of the torque transmission system 45 is performed gently. As a result, even when the torque transmission system 45 shifts to the driven state and thus produces vibration due to backlash of the torque transmission system 45, such vibration is decreased.

Coordinate control of the drive motor 41 and the brake device 20 in a vehicle that suspends actuation of the drive motor 41 while being in a stopped state will hereafter be described.

The vibration due to backlash of the torque transmission system 45 can occur when the vehicle is in a stopped state and the brake operation amount BP is decreased. That is, as illustrated in FIG. 2, if the brake operation amount BP is decreased when the vehicle is in a stopped state, decrease of the brake torque TB is given priority over increase of the creep torque TC. In this case, the brake torque TB is not applied to the wheels FL, FR, RL, RR and, afterwards, the creep torque TC is output by the drive motor 41.

Then, the torque transmission system 45 shifts from the state illustrated in FIG. 12B to the state illustrated in FIG. 12A, for example. That is, output of the creep torque TC by the drive motor 41 causes the tooth surface Gm1 of the gear Gm, which is connected to the drive motor, to contact the tooth surface Gt2 of the gear Gt, which is connected to the driven wheels. At this stage, if the brake torque TB is not applied to the driven wheels, the gear Gt is pressed by the gear Gm, which may produce vibration due to backlash of the torque transmission system 45. If such vibration is transmitted to the occupant of the vehicle as vehicle vibration before the vehicle starts, discomfort for the occupant may be caused.

In the present embodiment, to decrease vibration due to backlash of the torque transmission system 45, output of the creep torque TC by the drive motor 41 is started while the brake torque TB is still being applied to the driven wheels. This ensures that the brake torque is applied to the gear Gt when the creep torque TC is provided to the gear Gt through the gear Gm. As a result, vibration due to backlash of the torque transmission system 45 is decreased.

Next, with reference to the timing diagram of FIG. 7, the relationship between the brake operation amount BP and the creep torque TC output by the drive motor 41 will be described. The target brake torque TBt becomes greater as it becomes smaller than 0 (zero), or, in other words, greater in the negative direction, as viewed in the timing diagram.

Figure 7:
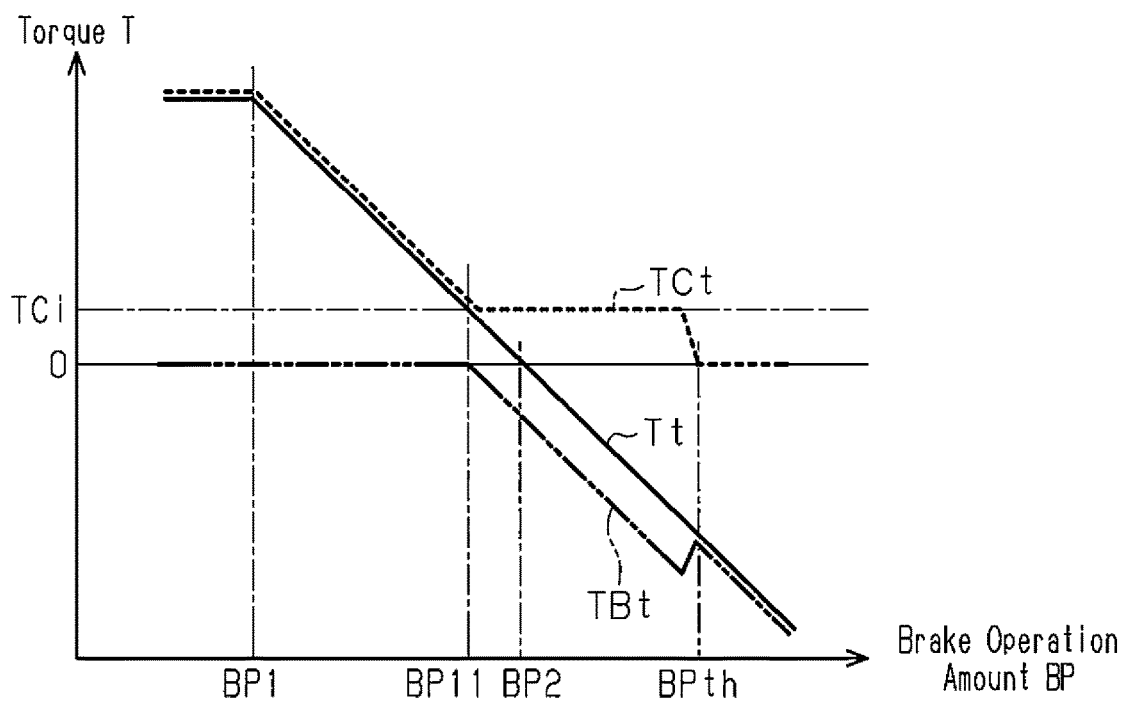
FIG. 7 is a timing diagram representing changes in the target torque, the target creep torque, and the target brake torque in correspondence with decrease of the brake operation amount when the brake operation amount is decreased with the vehicle in a stopped state.

Referring to FIG. 7, as long as the brake operation amount BP is greater than or equal to a predetermined operation amount determination value BPth, it can be assumed that the driver still has no intention to start the vehicle. Therefore, the target creep torque TCt is set to 0 (zero) and the target brake torque TBt is set to the value equal to the target torque Tt. Then, if the brake operation amount BP is decreased and becomes equal to the operation amount determination value BPth, the drive motor 41 starts to output the creep torque TC. The operation amount determination value BPth is greater than the brake operation amount BP at the time the target torque Tt, which is calculated in correspondence with the brake operation amount BP, becomes 0 (zero), or, in other words, the second operation amount BP2. Therefore, when the brake operation amount BP is equal to the operation amount determination value BPth, the brake torque TB is still being applied to the driven wheels by the brake device 20.

When a condition for starting output of the creep torque TC is satisfied as has been described, the target creep torque TCt is set to an initial torque TCi (TCi >0 (zero)). As a result, the target brake torque TBt is increased as the target creep torque TCt is increased. In this manner, the sum of the target creep torque TCt and the target brake torque TBt becomes equal to the target torque Tt.

The initial torque TCi may be any suitable value as long as the value is greater than or equal to the minimum torque necessary for eliminating backlash of the torque transmission system 45 and smaller than the current brake torque TB. As the creep torque TC is generated in this manner, the torque transmission system 45 shifts to the drive state. Specifically, when the brake operation amount BP is smaller than the operation amount determination value BPth, the target creep torque TCt may be increased either rapidly to the initial torque TCi as represented in FIG. 7 or, although not represented in the graph, in a stepped manner to the initial torque TCi.

The operation amount BP11 represented in FIG. 7 is the brake operation amount BP at the time the target torque Tt becomes equal to the initial torque TCi as the brake operation amount BP decreases. The operation amount BP11 is greater than the first operation amount BP1 and smaller than the second operation amount BP2.

Next, with reference to the flowchart of FIG. 8, a process routine executed by the control apparatus 10 to start the vehicle from a stopped state will be described. The process routine is carried out by predetermined control cycles when the driver does not perform the accelerator operation.

Figure 8:
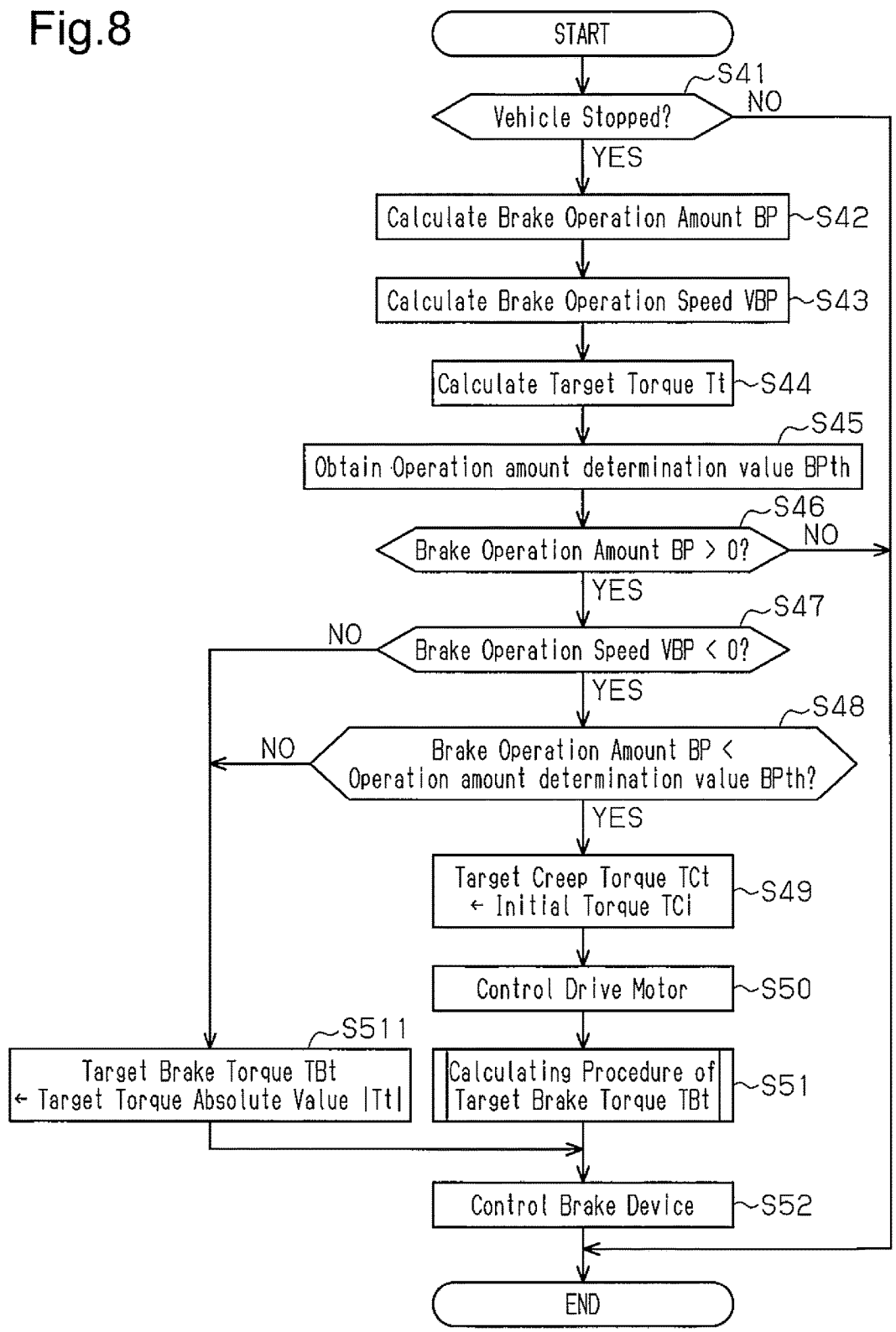
FIG. 8 is a flowchart representing a process routine executed when brake operation is being performed with the vehicle in a stopped state.

Referring to FIG. 8, in the process routine, the control apparatus 10 determines whether the vehicle is in a stopped state (Step S41). A determination that the vehicle is in a stopped state may be made when, for example, the wheel speed VW, which is calculated based on the detection results of the wheel speed sensors SE3 to SE6, is 0 (zero). If the control apparatus 10 determines that the vehicle is not in a stopped state (Step S41: NO), the control apparatus 10 suspends the process routine.

In contrast, if the control apparatus 10 determines that the vehicle is in a stopped state (Step 41: YES), the control apparatus 10 calculates the brake operation amount BP based on the detection signal provided by the brake operation amount detecting sensor SE1 (Step S42) and then calculates the brake operation speed VBP, which is the change speed of the brake operation amount BP (Step S43). The brake operation speed VBP is calculated in correspondence with the change amount of the brake operation amount BP from the previous execution of the process routine to the current execution. The brake operation speed VBP is a positive value when the brake operation amount BP is increased and a negative value when the brake operation amount BP is decreased.

The control apparatus 10 then calculates the target torque Tt based on the brake operation amount BP, which is calculated in Step S42 (Step S44). The target torque Tt becomes smaller as the brake operation amount BP becomes greater. Then, the control apparatus 10 obtains the operation amount determination value BPth (Step S45).

Subsequently, the control apparatus 10 determines whether the brake operation amount BP is greater than 0 (zero) (Step S46). When the brake operation amount BP is smaller than or equal to 0 (zero), it is possible to assume that the brake operation is not currently performed. Therefore, if the control apparatus 10 determines that the brake operation amount BP is smaller than or equal to 0 (zero) (Step S46: NO), the control apparatus 10 suspends the process routine. In contrast, if the control apparatus 10 determines that the brake operation amount BP is greater than 0 (zero) (Step S46: YES), the control apparatus 10 determines whether the brake operation speed VBP is smaller than 0 (zero) (Step S47). When the brake operation speed VBP is greater than or equal to 0 (zero), the brake operation amount BP is being increased or maintained. It is thus possible to assume that the driver has no intention to start the vehicle. In contrast, when the brake operation speed VBP is smaller than 0 (zero), the brake operation amount BP is decreased. It is thus possible to assume that the driver has the intention to start the vehicle.

Therefore, if the control apparatus 10 determines that the brake operation speed VBP is greater than or equal to 0 (zero) (Step S47: NO), the control apparatus 10 sets the target brake torque TBt as the absolute value |Tt| of the target torque (Step S511) and carries out Step S52, which will be described below. In contrast, if the control apparatus 10 determines that the brake operation speed VBP is smaller than 0 (zero) (Step S47: YES), the control apparatus 10 determines whether the brake operation amount BP is smaller than the operation amount determination value BPth (Step S48).

If a determination that the brake operation amount BP is greater than or equal to the operation amount determination value BPth is made (Step S48: NO), Step S511, which has been described above, is carried out. In contrast, if the control apparatus 10 determines that the brake operation amount BP is smaller than the operation amount determination value BPth (Step S48: YES), the control apparatus 10 sets the target creep torque TCt to the initial torque TCi (Step S49) and then controls the drive motor 41 such that the creep torque TC, which is output by the drive motor 41, approaches the target creep torque TCt (Step S50).

Subsequently, the control apparatus 10 performs a calculating procedure of the target brake torque TBt (Step S51). As has been described, the target brake torque TBt is the sum of the reference brake torque and the compensation brake torque. Afterwards, the control apparatus 10 carries out the subsequent step, which is Step S52.

In Step S52, the control apparatus 10 controls the brake device 20 such that the brake torque TB applied to the wheels FL, FR, RL, RR by the brake device 20 approaches the target brake torque TBt, which is calculated in Step S51 or S511. The control apparatus 10 then suspends the process routine.

Figure 9:
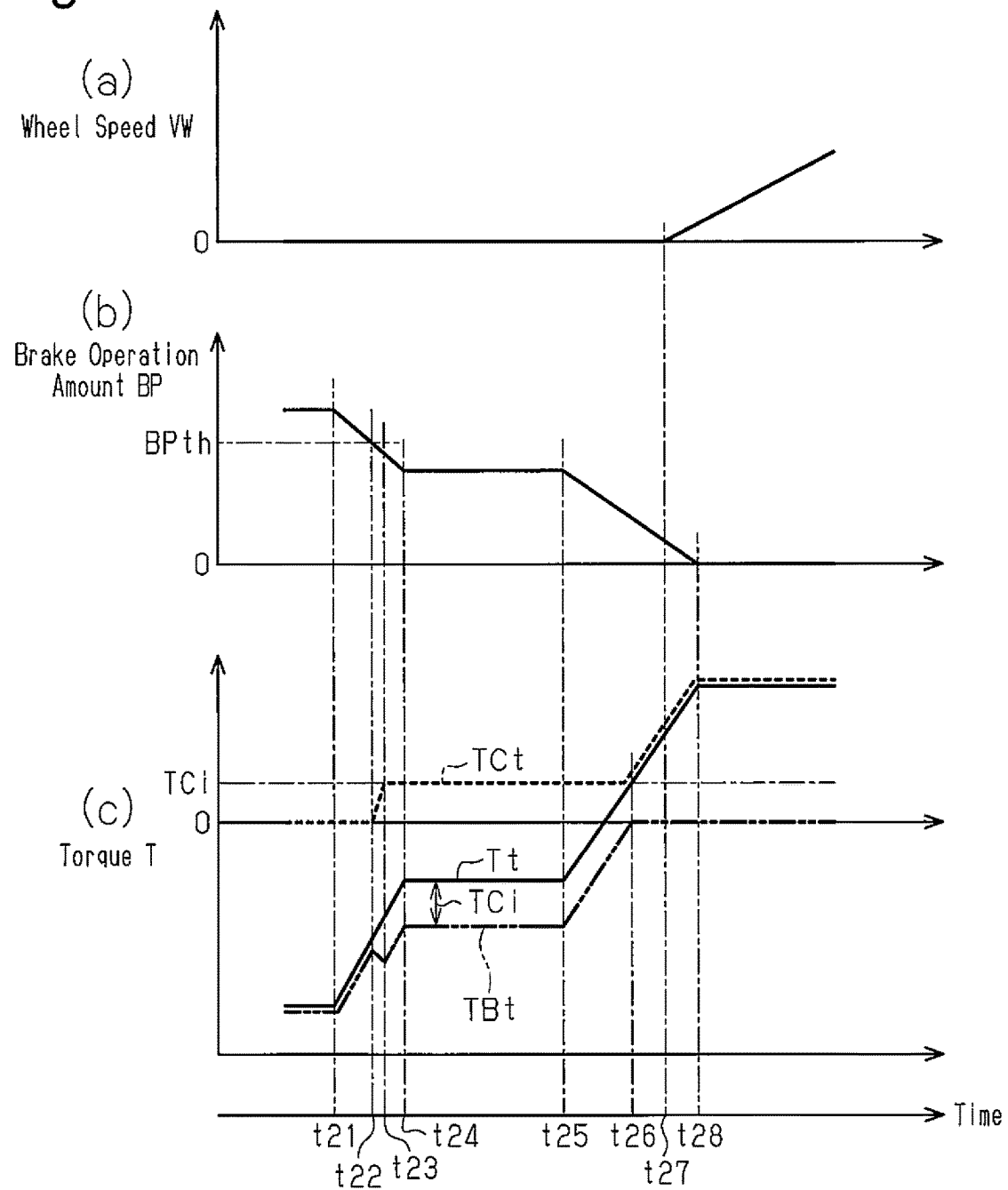
FIG. 9 is a timing diagram of a case in which the brake operation amount is decreased with the vehicle in a stopped state to start the vehicle, where section (a) represents changes in the wheel speed, section (b) represents changes in the brake operation amount, and section (c) represents changes in the target torque, the target creep torque, and the target brake torque.

With reference to the timing diagram of FIG. 9, operation of the vehicle at the time the vehicle is started will hereafter be described.

Referring to sections (a), (b), and (c) of FIG. 9, the brake operation amount BP is maintained greater than the operation amount determination value BPth and the vehicle is in a stopped state till the first time point t21. After the brake operation amount BP starts to decrease at the first time point t21, the target torque Tt is increased correspondingly. The target brake torque TBt is thus gradually decreased, and the brake torque TB is decreased. In the period from the first time point t21 to the second time point t22, the target brake torque TBt is equal to the target torque Tt and thus the target creep torque TCt is maintained at 0 (zero). Accordingly, the drive motor 41 is still maintained in a stopped state.

After the brake operation amount BP becomes equal to the operation amount determination value BPth at the second time point t22, the target creep torque TCt is increased to the initial torque TCi. That is, at the second time point t22, the drive motor 41 starts to output the creep torque TC. After output of the creep torque TC is started, the target brake torque TBt is increased as the target creep torque TCt is increased. As a result, in the period from the second time point t22 to the third time point t23, the brake torque TB is increased by the amount corresponding to the initial torque TCi. The initial torque TCi is sufficiently smaller than the brake torque TB at the second time point t22. As a result, at the time point at which the drive motor 41 starts to output the creep torque TC, the vehicle is not yet started.

From the third time point t23, the target creep torque TCt, which is the creep torque TC, is maintained at the initial torque TCi for a certain period of time.

In the period from the second time point t22 to the third time point t23, the creep torque TC corresponding to the initial torque TCi is output by the drive motor 41 while the brake torque TB is applied to the front wheels FL, FR, which are the driven wheels. That is, while the brake torque TB is still being applied to the front wheels FL, FR, output of the creep torque TC is started to cause the torque transmission system 45 to shift to the drive state. As a result, even if vibration due to backlash of the torque transmission system 45 occurs, the vibration is decreased.

Then, at the subsequent fourth time point t24, the driver starts to maintain the brake operation amount BP. As a result, in the period from the fourth time point t24 to the fifth time point t25, at which the brake operation amount BP starts to re-decrease, the target torque Tt, the target brake torque TBt, and the target creep torque TCt are maintained. After the fifth time point t25, at which the brake operation amount BP starts to re-decrease, the target brake torque TBt is decreased as the target torque Tt is increased. That is, the brake torque TB is gradually decreased.

At the sixth time point t26, the target torque Tt becomes equal to the initial torque TCi and the target brake torque TBt becomes 0 (zero). As a result, from the sixth time point t26, the brake torque TB is not applied to the wheels FL, FR, RL, RR. From this time point, as the target brake torque TBt and the target creep torque TCt are increased as the brake operation amount BP is decreased, the creep torque TC is gradually increased. Then, at the seventh time point t27, the creep torque TC becomes greater than the minimum torque necessary for starting the vehicle, thus starting the vehicle. Afterwards, from the eighth time point t28, at which the brake operation amount BP becomes 0 (zero), the target torque Tt and the target creep torque TCt are maintained unless the accelerator operation is started.

The above described embodiment has the following advantages.

(1) When the brake operation amount BP is increased under a condition in which the drive motor 41 is outputting the creep torque TC, the decrease gradient of the creep torque TC is set smaller than the decrease gradient of the target torque Tt. This increases the brake torque applied to the wheels FL, FR, RL, RR while decreasing the creep torque TC. As a result, the torque transmission system 45 gently shifts from the drive state to the driven state. This decreases vibration due to backlash of the torque transmission system 45 when the torque transmission system 45 shifts to the driven state. Further, since the creep torque TC is decreased as the brake operation amount BP increases, the power consumed by the vehicle is reduced compared to a case in which the creep torque TC is maintained constant even when the brake operation is being carried out. As a result, the power consumed by the vehicle is reduced and the vibration due to backlash of the torque transmission system 45 is decreased.

(2) In the present embodiment, the decrease gradient of the creep torque TC becomes smaller as the creep torque TC becomes smaller until the creep torque TC becomes equal to the predetermined creep torque TC2. Therefore, by setting the creep torque TC2 equal to the aforementioned transitional torque TCm, gentle transition of the torque transmission system 45 from the drive state to the driven state is ensured. As a result, vibration due to backlash of the torque transmission system 45 is decreased.

(3) In the present embodiment, if the brake operation is performed when the drive motor 41 outputs the creep torque TC, the drive motor 41 is stopped before the vehicle is stopped. This reduces the power consumed by the vehicle compared to a case in which the drive motor 41 still runs even after the vehicle is stopped.

(4) If the brake operation amount BP is decreased when the vehicle is in a stopped state, the drive motor 41 starts to output the creep torque TC while the brake torque TB is still being applied to the front wheels FL, FR, which are the driven wheels. This decreases vibration due to backlash of the torque transmission system 45 when the vehicle is started. Also, in the present embodiment, the drive motor 41 is stopped if the brake operation amount BP is greater than or equal to the operation amount determination value BPth. This reduces the power consumed by the vehicle compared to a case in which the drive motor 41 continues to output the creep torque TC even when the brake operation amount BP is greater than or equal to the operation amount determination value BPth. As a result, even when the vehicle is starting, the power consumed by the vehicle is reduced and the vibration due to backlash of the torque transmission system 45 is decreased.

The above described embodiment may be modified as follows.

When the wheel speed VW is great (the vehicle body speed is great), the vehicle is easily vibrated by disturbance such as input from the road surface compared to when the wheel speed VW is small (the vehicle body speed is small). In other words, the smaller the wheel speed VW, the more likely vibration due to backlash of the torque transmission system 45 will cause discomfort for the occupant of the vehicle.

Figure 10:
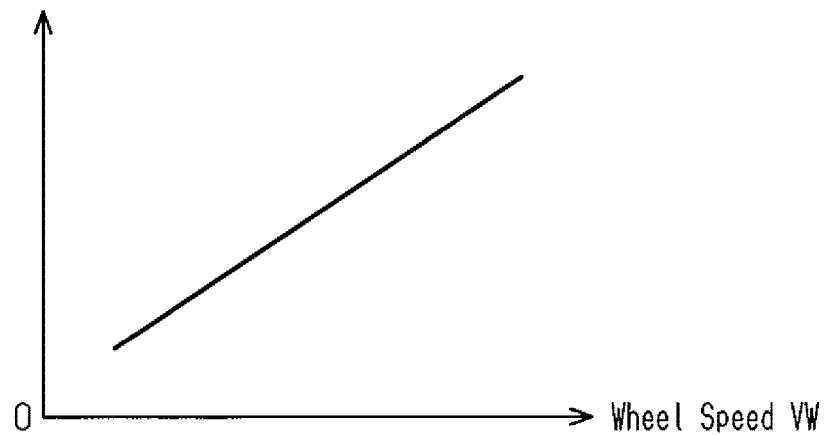
FIG. 10 is a map representing a relationship between the wheel speed and a speed correction coefficient.

Therefore, when the brake operation is being performed under a condition in which the creep torque TC is being output, the decrease gradient of the creep torque may be set smaller as the wheel speed VW becomes smaller. That is, the control apparatus 10 may determine the change gradient determination value VTCth with reference to the map of FIG. 10, which is a modification of the map of FIG. 3. The map of FIG. 10 represents the relationship between a speed correction coefficient Cv for correcting the change gradient determination value VTCth and the wheel speed VW. With reference to FIG. 10, the speed correction coefficient Cv becomes smaller as the wheel speed VW becomes smaller. The change gradient determination value VTCth determined in correspondence with the creep torque TC is multiplied by the speed correction coefficient Cv, which is determined referring to the map of FIG. 10. The product (VTCth·Cv) is then set as the change gradient determination value VTCth. By restricting decrease of the creep torque TC in accordance with the change gradient determination value VTCth, it is ensured that the decrease gradient of the creep torque is set smaller as the wheel speed VW becomes smaller. As a result, as the wheel speed VW becomes smaller, transition of the torque transmission system 45 from the drive state to the driven state occurs more gently. This restrains discomfort for the occupant of the vehicle brought about by vibration due to backlash of the torque transmission system 45, even when the wheel speed VW is small.

In this configuration, as the wheel speed VW becomes greater, the decrease gradient of the creep torque becomes greater. As a result, when the wheel speed VW is great and thus increases disturbance received by the vehicle, the creep torque TC is rapidly decreased to improve the effect of reducing the power consumed by the vehicle.

Figure 11:
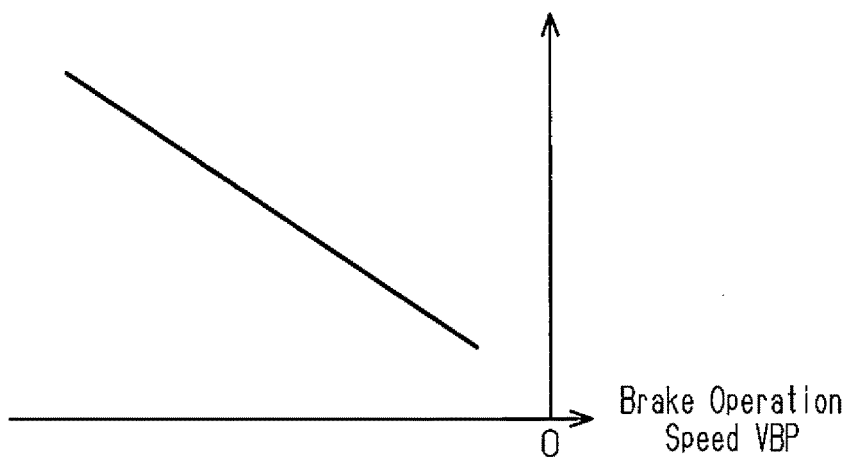
FIG. 11 is a map representing a relationship between the brake operation speed and an operation amount determination value.

When the driver intends to start the vehicle quickly from a stopped state, the decrease speed of the brake operation amount BP tends to be great. The greater the decrease speed of the brake operation amount BP, the earlier the target torque Tt becomes great. The target torque Tt thus exceeds a torque necessary for starting the vehicle at an early stage. Therefore, the operation amount determination value BPth, which is constant in the above illustrated embodiment, may be set smaller as the brake operation speed VBP becomes smaller. That is, the control apparatus 10 may determine the operation amount determination value BPth with reference to the map of FIG. 11 representing the relationship between the brake operation speed VBP and the operation amount determination value BPth, separately from the maps of FIGS. 3 and 10. Referring to FIG. 11, the operation amount determination value BPth is set greater as the absolute value |VBP| of the brake operation speed at the time the brake operation amount BP decreases becomes greater.

In this configuration, if the brake operation speed VBP is great and thus indicates that the driver has the intention to start the vehicle quickly, the operation amount determination value BPth is increased. This causes the drive motor 41 to start to output the creep torque TC comparatively early. The creep torque TC output by the drive motor 41 is thus made unlikely to be smaller than the initial torque TCi even after the target torque Tt has satisfied the torque necessary for starting the vehicle. As a result, vibration due to backlash of the torque transmission system 45 is decreased and quick starting of the vehicle is promoted.

In contrast, when the brake operation speed VBP is small and thus indicates that the driver has the intention to gently start the vehicle, the operation amount determination value BPth is decreased. The drive motor 41 is thus caused to start to output the creep torque TC comparatively late. This shortens the period from when output of the creep torque TC is started to when the vehicle is actually started, thus reducing the power consumed by the vehicle.

It is preferable that the control apparatus 10 determine the operation amount determination value BPth in correspondence with the brake operation amount VBP. In this case, the control apparatus 10 functions as an example of a reference value determining section.

In the above illustrated embodiment, if the brake operation is started under a condition in which the creep torque TC is being output, the drive motor 41 is stopped before the vehicle is stopped. However, the target creep torque TCt may be adjusted such that the drive motor 41 is stopped after the vehicle is stopped.

In the above illustrated embodiment, if the brake operation is started under a condition in which the creep torque TC is being output, the decrease gradient of the target creep torque TCt is changed as the time elapses. However, as long as the decrease gradient of the target creep torque TCt is smaller than the decrease gradient of the target torque Tt that accompanies increase in the brake operation amount BP, the target creep torque TCt may be decreased by a constant gradient. Even this configuration ensures the same advantage as the advantage (1).

If the brake operation is started under a condition in which the creep torque TC is being output, the creep torque TC may be decreased rapidly when the target creep torque TCt, which is the creep torque TC, becomes less than the predetermined creep torque TC2. In this case, it is preferable that the decrease gradient of the target creep torque TCt be set in correspondence with the response speed of the brake device 20.

When the brake operation amount BP is decreased to start the vehicle from a stopped state, the increase gradient of the target creep torque TCt from the time point at which the brake operation amount BP becomes smaller than or equal to the operation amount determination value BPth may be varied in correspondence with the decrease speed of the brake operation amount BP. That is, the increase gradient of the target creep torque TCt may be set smaller as the decrease speed of the brake operation amount BP becomes smaller. This decreases the creep torque TC output by the drive motor 41 when the vehicle is in a stopped state, thus reducing the power consumed by the vehicle.

When the brake operation amount BP is decreased to start the vehicle from a stopped state, the brake torque TB applied to the front wheels FL, FR, which are the driven wheels, may be maintained for a certain period of time after the brake operation amount BP becomes smaller than or equal to the operation amount determination value BPth and the drive motor 41 starts to output the creep torque TC. That is, referring to the timing diagram of FIG. 9 by way of example, in the period from the second time point t22 to the third time point t23, the target brake torque TBt does not necessarily have to be increased when output of the target creep torque TCt is started.

In the above-described vehicle, the torque transmission system 45 has the decelerator 42. The level of vibration due to backlash of the torque transmission system 45 can vary in correspondence with viscosity of fluid used in the decelerator 42 (or a factor that can vary the viscosity of fluid, such as temperature). Therefore, if the brake operation is carried out when the drive motor 41 is outputting the creep torque TC, the manner of decreasing the creep torque TC may be changed appropriately in correspondence with the viscosity of the aforementioned fluid (or the temperature of the fluid).

The coordinate control of the drive motor 41 and the brake device 20, which has been described in the above illustrated embodiment, may be employed for not only when the vehicle proceeds but also when the vehicle reverses.

If the brake operation amount BP is increased under a condition in which the drive motor 41 is outputting the creep torque TC, the control apparatus 10 does not have to perform the coordinate control of the drive motor 41 and the brake device 20. In this case, it is preferable that, even after the brake operation is started, the creep torque TC be maintained until the vehicle is stopped. The creep torque TC may be decreased after the vehicle is stopped.

Under a condition in which the brake operation amount BP is being decreased when the vehicle is in a stopped state, the control apparatus 10 does not have to carry out the coordinate control of the drive motor 41 and the brake device 20.

The vehicle including the control apparatus 10 is not restricted to an electric vehicle but may be a hybrid vehicle including the drive motor 41 and an engine each as a drive source as long as the vehicle includes the drive motor 41 as a drive source.

Therefore, the present examples and embodiments are to be considered as illustrative and not restrictive and the invention is not to be limited to the details given herein, but may be modified within the scope and equivalence of the appended claims.

The invention claimed is:

1. A control apparatus for a vehicle adapted for a vehicle having a drive motor for outputting creep torque to a wheel when accelerator operation is not being performed by a driver and a brake device for applying brake torque to the wheel, the control apparatus comprising processing circuitry that calculates a target torque that is a target value of a composite torque of the brake torque applied to the wheel by the brake device and the creep torque output by the drive motor such that the greater an amount of brake operation is, the smaller the target torque becomes, controls the drive motor such that the creep torque output by the drive motor is smaller when brake operation is being performed by the driver than when the brake operation is not being performed by the driver, controls the brake device such that, when the brake operation is being performed by the driver, the brake torque applied to the wheel by the brake device approaches a target brake torque corresponding to a difference between the target torque and the creep torque, and sets a decrease gradient of the creep torque to be smaller than a decrease gradient of the target torque when the brake operation amount is increased under a condition in which the creep torque is being output by the drive motor.

2. The control apparatus according to claim 1, wherein the processing circuitry is configured to set the decrease gradient such that the smaller a rotation speed of the wheel is, the smaller the decrease gradient of the creep torque becomes.

3. The control apparatus according to claim 1, wherein the processing circuitry is configured to gradually decrease the decrease gradient of the creep torque until the decrease gradient of the creep torque is minimized when the brake operation is being performed by the driver under a condition in which the creep torque is being output by the drive motor.

4. The control apparatus according to claim 1, wherein the processing circuitry stops the drive motor when the vehicle is in a stopped state through application of the brake torque to the wheel by the brake device in response to the brake operation by the driver, and operates the drive motor to start to output the creep torque when the brake device is applying the brake torque to the wheel in a state in which the brake operation amount is decreased with the vehicle in a stopped state.

5. The control apparatus according to claim 4, wherein the processing circuitry operates the drive motor to start to output the creep torque when the brake operation amount becomes smaller than an operation amount determination value in a state in which the brake operation amount is decreased with the vehicle in a stopped state, and sets the operation amount determination value such that the smaller a decrease speed of the brake operation amount is, the smaller the operation amount determination value becomes.

6. A control apparatus for a vehicle adapted for a vehicle having a drive motor for outputting creep torque to a wheel when accelerator operation is not being performed by a driver and a brake device for applying brake torque to the wheel, the control apparatus comprising processing circuitry that calculates a target torque that is a target value of a composite torque of the brake torque applied to the wheel by the brake device and the creep torque output by the drive motor such that the greater an amount of brake operation is, the smaller the target torque becomes, stops the drive motor when the accelerator operation is not being performed by the driver with the vehicle in a stopped state, controls the brake device such that, when the brake operation is being performed by the driver, the brake torque applied to the wheel by the brake device approaches a target brake torque corresponding to a difference between the target torque and the creep torque, and operates the drive motor to start to output the creep torque when the brake device is applying the brake torque to the wheel in a state in which the brake operation amount is decreased with the vehicle in a stopped state.

7. The control apparatus according to claim 6, wherein the control circuitry operates the drive motor to start to output the creep torque when the brake operation amount becomes smaller than an operation amount determination value in a state in which the brake operation amount is decreased with the vehicle in a stopped state, and sets the operation amount determination value such that the smaller a decrease speed of the brake operation amount is, the smaller the operation amount determination value becomes.

* * * * *